R. H. WHITE.
MEANS FOR DUST PROOFING ROTATING GEAR CASES.
APPLICATION FILED MAY 1, 1919.
1,359,553.
Patented Nov. 23, 1920.
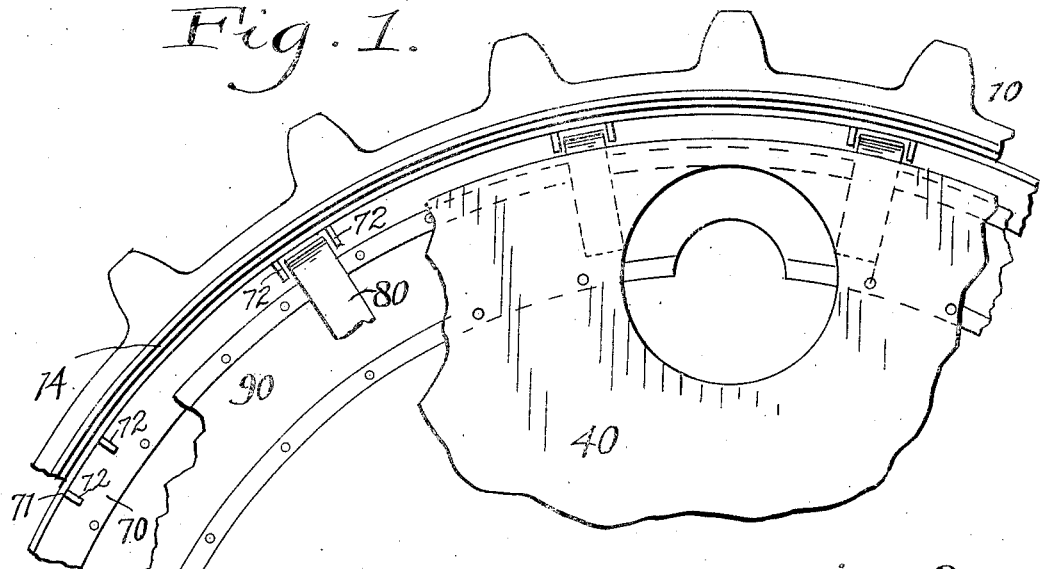
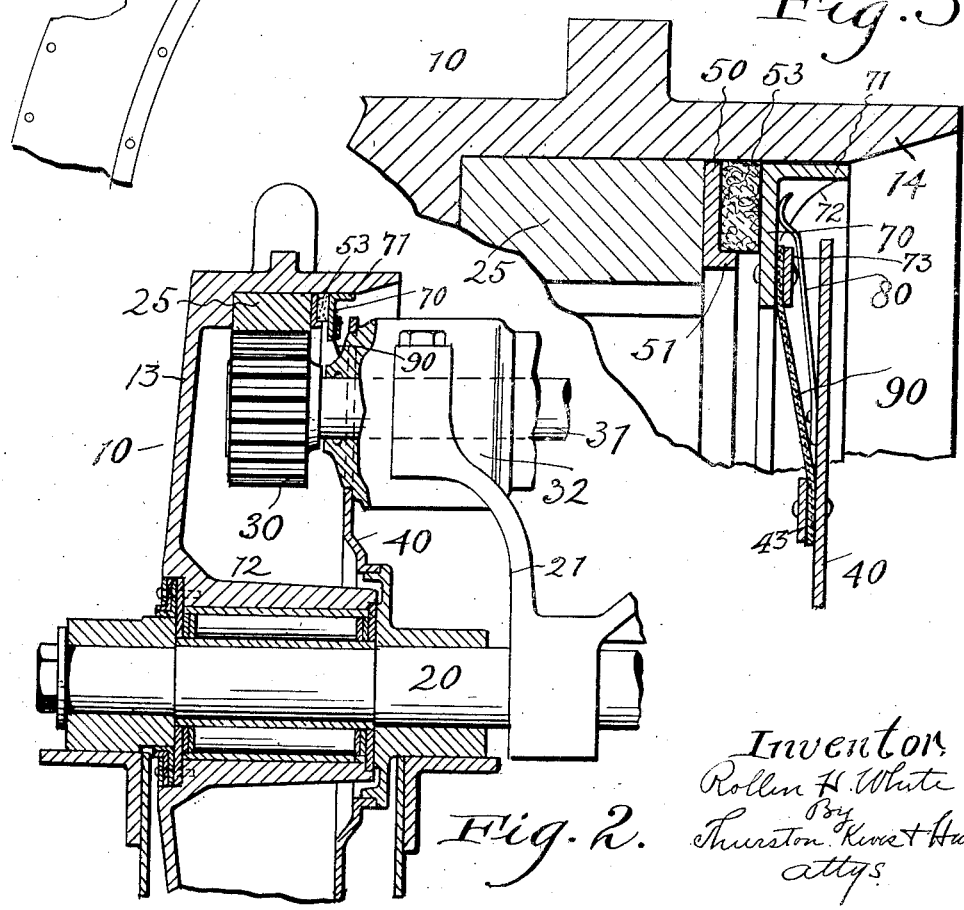

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

MEANS FOR DUST-PROOFING ROTATING GEAR-CASES.

1,359,553.    Specification of Letters Patent.    Patented Nov. 23, 1920.

Application filed May 1, 1919. Serial No. 293,967.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Means for Dust-Proofing Rotating Gear-Cases, of which the following is a full, clear, and exact description.

In certain kinds of motor vehicles, as for example, trucks and tractors, the driving wheels are hollow, and each contains an internal ring gear; and each of said wheels is rotated by a pinion which engages said ring gear, and is fixed to a shaft, that in turn is mounted in bearings carried by the main frame of the vehicle.

The hollow center of the wheel serves, therefore, as a gear case, in which it is desirable to confine oil to lubricate the gears and the wheel bearings, and from which it is equally desirable to exclude dust, dirt, water and the like. It is customary to close the outer end of the gear case by means of a plate which is an integral part of the wheel.

The object of the present invention is to provide a suitable closure for the inside end of this gear case of such a character that it will prevent the escape of oil from the gear case, and will prevent the entry of dust, dirt, and water to the same.

The invention consists in the construction and combination of parts shown in the drawing and hereinafter described and pointed out definitely in the appended claims.

In the drawings, Figure 1 is an inside view of a part of said wheel with certain parts broken away to show the parts behind the broken away parts; Fig. 2 is a central sectional view of more than one half of the wheel and its associated parts, the section being in the plane which passes through the driving shaft; Fig. 3 is an enlarged radial section in a plane such as indicated by line 3—3 on Fig. 1.

The invention is exemplified in connection with the driving sprocket wheel of a track laying tractor of the type which is disclosed in the White Patent No. 1,275,344; but obviously the invention is not limited to this particular use.

The wheel 10 as shown is formed with a hub 12, a cylindrical flange 14, and an outside plate 13 which connects the hub and rim and is integral with both, and furnishes the outside wall of the gear case within the wheel. The hub 12 is rotatably mounted upon a nonrotating axle 20 on a bracket 21 which is fixed to the main frame of the vehicle. An internal ring gear 25 is fitted within the cylindrical flange 14 of the wheel and is there secured. A pinion 30 located within the wheel meshes with this ring gear and is fixed to a rotating driving shaft 31 which is rotatably mounted in bearings in a bracket 32 which is also secured to the main frame of the machine.

To the extent above described the construction as shown is substantially like that shown in the above mentioned prior patent. The means for making a dust and water tight joint between the wheel and its supporting bearing, and between the inner periphery of the disk 40 and the part surrounding axle 20 with which said disk engages may be as shown in said prior patent, or may have any other suitable construction, but is not material to the present invention.

A disk or plate 40 which may be made of thin sheet metal is fixed to the end of the bracket 32 whereby it lies inside of the wheel flange 14. A packing holding ring 50 is fitted within flange 14 of the wheel and is secured, preferably by spot welding, to the adjacent face of the ring gear 25. This packing ring has at the inner periphery a cylindrical flange 51 which extends away from said ring gear.

A ring 70 is rotatably fitted within the flange 14 and has at its outer periphery the cylindrical flange 71 the function of which is to give a wider bearing for the ring in the wheel flange.

In the annular space bounded by the two rings 50 and 70 and by the wheel flange 14 and the flange 51 of ring 50, a felt packing ring 53 is fitted. This ring when slightly deformed by pressure from ring 70 will tightly fit within the flange 14 of the wheel.

A plurality of flat springs 80 are fixed by rivets or spot welding to the disk 40; and their free outer ends engage the face of ring 70 and press it yieldingly against the felt packing ring 53 thereby slightly deforming it so that it will make a tight joint with the flange 14. Moreover, the pressure of the ring 70 against the packing ring 53 will cause their abutting surfaces to engage and thereby make a tight water, dust and oil proof joint between them. The ends of the springs 80 go between ribs or lugs 72 on the ring 70, and thereby hold said ring against rotation.

An annular disk 90 of canvas, leather or some analogous material is employed to close the opening between disk 40 and ring 70. The outer edge of the canvas disk is clamped between ring 70 and a clamping ring 73 which is riveted to it; and the inner edge of this canvas ring is clamped between disk 40 and a clamping ring 43 which is riveted to it.

When the parts have been combined and connected together as stated and the wheel is rotated, the packing disk 53 will rotate with the wheel and its outside face will rub against the inner face of the ring 70. The latter ring will remain stationary, that is, will be held against rotation by the spring 80.

Having described my invention, I claim:—

1. The combination of a rotatable hollow wheel having a concentric cylindrical flange, an internal ring gear fitted to and secured within the said flange, a fixed bracket adjacent the open end of said flange, a shaft mounted in said bracket, a pinion secured to said shaft in mesh with said ring gear, and a disk fixed to said bracket within said wheel flange, a packing holding ring which is fixed to the wheel and has at its inner periphery a flange which extends toward said disk, a second ring which is rotatably fitted within said wheel flange, a ring of packing material fitted in the space between said two rings and between the flange on the first named ring and the flange on the wheel, and a plurality of springs secured to said disk and pressing yieldingly against the face of the last mentioned ring.

2. The combination of a rotatable hollow wheel having a concentric cylindrical flange, an internal ring gear fitted to and secured within the said flange, a fixed bracket adjacent the open end of said flange, a shaft mounted in said bracket, a pinion secured to said shaft in mesh with said ring gear, and a disk fixed to said bracket within said wheel flange, a packing holding ring which is fixed to the wheel and has at its inner periphery a flange which extends toward said disk, a second ring which is rotatably fitted within said flange, a ring of packing material fitted in the space between said two rings and between the flange on the first named ring and the flange on the wheel, and a plurality of springs secured to said disk and pressing yieldingly against the face of the last mentioned ring, and lugs on said ring between which said springs project to prevent the rotation of said ring.

3. The combination of a rotatable hollow wheel having a concentric cylindrical flange, an internal ring gear fitted to and secured within the said flange, a fixed bracket adjacent the open end of said flange, a shaft mounted in said bracket, a pinion secured to said shaft in mesh with said ring gear, and a disk fixed to said bracket within said wheel flange, a packing holding ring which is fixed to the wheel and has at its inner periphery a flange which extends toward said disk, a second ring which is rotatably fitted within said wheel flange, a ring of packing material fitted in the space between said two rings and between the flange on the first named ring and the flange on the wheel, and a plurality of springs secured to said disk and pressing yieldingly against the face of the last mentioned ring and an annular disk of canvas or the like which is clamped to the outside face of the last mentioned ring and to the inside face of said ring.

4. The combination of a rotatable hollow wheel having a concentric cylindrical flange, a driving shaft which projects into said wheel, gearing within the wheel for transmitting motion for said shaft to said wheel, a fixed disk within said wheel flange, a ring of packing material fitted within said wheel flange, a non-rotatable ring within said wheel flange, springs acting on said non-rotating ring to press it against said ring of packing, and a ring of canvas or the like which is clamped to said non-rotating ring and to the said disk.

In testimony whereof, I hereunto affix my signature.

ROLLIN H. WHITE.